March 10, 1936.  J. BERGSTRÖM  2,033,677
ADJUSTING DEVICE IN MACHINE TOOLS FOR ADJUSTMENT OF A TOOL REST
Filed July 13, 1934

Inventor:
John Bergström

Patented Mar. 10, 1936

2,033,677

UNITED STATES PATENT OFFICE 2,033,677

ADJUSTING DEVICE IN MACHINE TOOLS FOR ADJUSTMENT OF A TOOL REST

John Bergström, Vaster, Halmstad, Sweden, assignor to Aktiebolaget Malcus Holmquist, Halmstad, Sweden Application July 13, 1934, Serial No. 735,071
In Sweden July 26, 1933

7 Claims. (Cl. 82—24)

In machine tools a stop is often used for limiting the advance of a tool rest. In some cases it is required that this stop be adjusted within very fine limits and the adjustment is then made by means of a worm gear and a crank fastened to the worm with graduated plate and stop for the same. The said graduated plate, however, can turn only through part of a complete circle because its stop is fixed, rigid and not removable. If a greater movement of the tool rest is required other devices must then be employed.

The present invention has for its object to render such additional devices unnecessary, by making the stop for the graduated plate in the form of a rotatable bolt, which can be removed from its bearing and which is provided at its projecting end with a plurality of plane stop surfaces for the graduated plate, which surfaces are arranged at different distances from the axis of the bolt.

The accompanying drawing illustrates an embodiment of the invention adapted to be applied to a centreless grinding machine and in this drawing:

Fig. 2 is a front view of the assembly shown in Fig. 1, while

Figure 2:
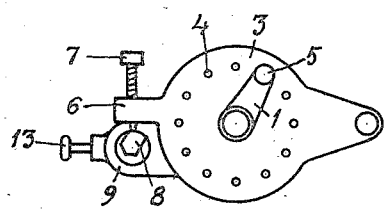
Figure 3:
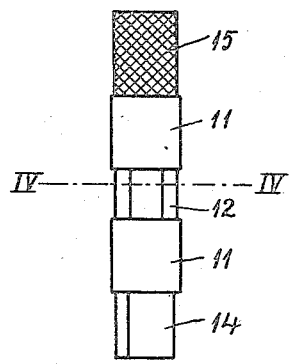
Figs. 3 to 5 show details of construction, drawn to a larger scale.
Figure 1:
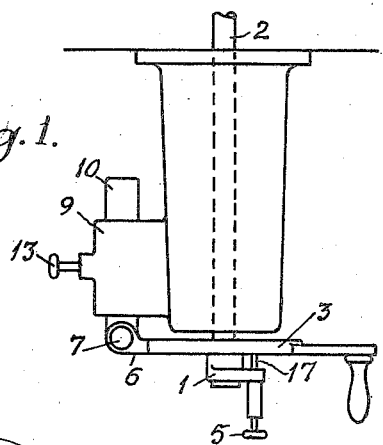
Fig. 1 is a side view of a worm spindle and its mounting, the worm and the worm wheel which it drives not being shown.
Figure 4:
Figure 5:
Figure 6:
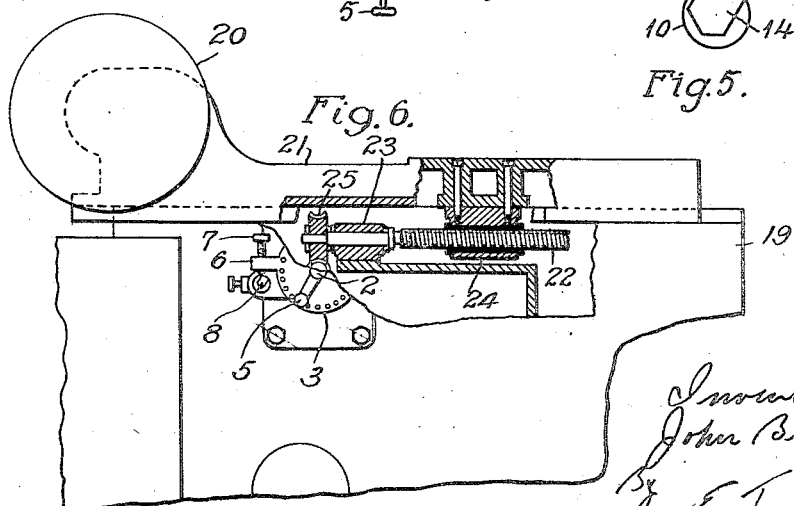
Fig. 6 shows part of a grinding machine with the device indicated.

The crank arm 1 is fastened to the worm spindle 2 and is, in known manner, provided with the graduated plate 3 with holes 4 for receiving the end of an adjusting pin 17 with a knob or handle 5. The graduated plate 3 is provided with a lug 6 for an adjusting screw 7, the end of which bears against a stop 8, which consists of a bolt 10, rotatable in and removable from a bracket 9 fixed to the machine frame. This bolt is shown in side view in Fig. 3, while Fig. 4 is a section on the line IV—IV of Fig. 3 and Fig. 5 an end view of the said bolt, seen from the end at which the abutment surfaces for the adjusting screw 7 are arranged.

The device can be fixed to the frame 19 of a centerless grinding machine with a grinding wheel 20 journalled in a tool rest 21 which is slidable on suitable guides in the frame 19. A screw spindle 22 is rotatable in a support 23 in the frame 19 but prevented from axial movement. The screw spindle 22 coacts with a threaded nut 24 fixed to the tool rest 21. A worm wheel 25 is keyed to the end of the screw spindle 22 and coacts with the worm spindle 2. The movement of the tool rest 21 with the grinding wheel 20 is performed by rotating the spindle 2 in either direction.

When the required adjustment of the tool rest amounts to say, five hundredths of a millimetre or a multiple of that amount, the adjusting pin 17 of the arm 5 is moved to another hole 4 in known manner, but if it be desired to shift the tool rest through a smaller distance, the bolt 10 is used and the procedure is as follows:—The bolt comprises two cylindrical portions 11, an intermediate angular portion 12 with plane surfaces adapted to co-act with a set-pin 13, removably fitted in the bracket 9, for locating the bolt in any of several positions to which it may be turned, an outer end portion 14 with plane stop surfaces 16 for the adjusting screw 7 and an inner end portion 15, which serves as a handle for rotating of the said bolt. The surfaces 16 lie at different distances from the centre of the bolt. By way of example it may be supposed that the adjusting screw 7 is resting against the cylindrical part 18 of the portion 14 in Fig. 5 when the adjustment of the tool rest is effected by means of the adjusting pin 17 and holes 4. If now a displacement of the tool rest by only one hundredth of a millimetre be desired, the bolt 10 is turned, so that the next adjacent plane surface comes under the adjusting screw 7. Every such partial rotation of the bolt increases the advance of the tool rest by one hundredth part of a millimetre. If, now, a movement of less than one hundredth of a millimetre, be desired, the adjusting screw 7 is turned. For the purposes of this last named adjustment the screw 7 is graduated and indicates, for instance, thousandths of a millimetre.

In the example illustrated the bolt 10 can be fixed by the member 13 in five different positions corresponding to the four plane surfaces of the portion 14 and the cylindrical part 18 of the same.

As shown, the crank 1 can also be rotated freely to move the tool rest backwards and forwards as far as may be desired provided that the bolt 10 be retracted into its bracket 9 or entirely removed.

I claim:—

1. In a machine tool having a tool rest and a wheel gearing, a worm-bearing spindle, the worm cooperating with said wheel gearing to advance the tool rest, a crank fixed on said spindle, an adjustable graduated plate with which said crank is associated, and an adjustable stop for said plate, said stop comprising a bolt, and a bearing within which the bolt is rotatable and removable, one end of said bolt projecting from said bearing and having a plurality of plane stop surfaces arranged at different distances from the axis of said bolt.

2. In a machine tool having a tool rest and a wheel gearing, a worm-bearing spindle, the worm cooperating with said wheel gearing to advance the tool rest, means for producing a rough adjustment or advancement of the spindle through a predetermined amount, and means for producing fine adjustments within each rough adjustment, the said last-mentioned means comprising a multi-surfaced, rotatable bolt and a contact member cooperating therewith and adapted to cause the rotation of said spindle, each surface of said bolt being spaced from the axis of the bolt a distance which bears a predetermined difference to the spacing of the adjacent surfaces with respect to said axis.

3. In a machine tool having a tool rest and a wheel gearing, a worm-bearing spindle, the worm cooperating with said wheel gearing to advance the tool rest, means for producing a rough adjustment or advancement of the spindle, the said means comprising a crank on said spindle, a graduated plate loosely mounted on said spindle having a plurality of openings disposed radially thereabout, and a pin extending through said crank and adapted to be received into the openings of said plate, and means for producing a fine adjustment of said spindle within the range of adjustment between two adjacent rough adjustments, the said last-mentioned means comprising a multi-surfaced, rotatable bolt, and a cooperating member adapted to bear thereagainst and carried by said graduated plate, each surface of said bolt being spaced from the axis thereof a distance which bears a predetermined difference to the spacing of adjacent surfaces with respect to said axis.

4. In a machine tool having a tool rest and a wheel gearing, a worm-bearing spindle, the worm cooperating with said wheel gearing to advance the tool rest, means for producing a rough adjustment or advancement of the spindle through a predetermined amount, and means for producing fine adjustments within each rough adjustment, the said last-mentioned means comprising a multi-surfaced, rotatable bolt and a contact member cooperating therewith and adapted to cause the rotation of said spindle, each surface of said bolt being spaced from the axis of the bolt a distance which bears a predetermined difference to the spacing of the adjacent surfaces with respect to said axis, the said cooperating member comprising a micrometer screw extending through a lug on the said graduated plate and having graduations thereon whereby ultrafine adjustments of the spindle are obtainable.

5. In a machine tool having a tool rest and a wheel gearing, a worm-bearing spindle, the worm cooperating with said wheel gearing to advance the tool rest, means for producing a rough adjustment or advancement of the spindle, the said means comprising a crank on said spindle, a graduated plate loosely mounted on said spindle having a plurality of openings disposed radially thereabout, and a pin extending through said crank and adapted to be received into the openings of said plate, and means for producing a fine adjustment of said spindle within the range of adjustment between two adjacent rough adjustments, the said last-mentioned means comprising a multi-surfaced, rotatable bolt, and a cooperating member adapted to bear thereagainst and carried by said graduated plate, each surface of said bolt being spaced from the axis thereof a distance which bears a predetermined difference to the spacing of adjacent surfaces with respect to said axis, the said cooperating member comprising a micrometer screw extending through a lug on the said graduated plate and having graduations thereon whereby ultrafine adjustments of the spindle are obtainable.

6. As an element of a tool rest adjusting mechanism, a bolt, the said bolt comprising an elongated member having a handle at one end, two substantially cylindrical bearing surfaces disposed intermediate of the end of said bolt, disposed substantially symmetrically on opposite sides of the transverse center of the bolt, the central portion of the bolt between the two bearing portions having plane surfaces defining a symmetrical polygon adapted to receive a set screw, the other end of said bolt having a plurality of surfaces, each surface of which is disposed at a distance from the axis of the bolt which has a predetermined difference with respect to the distances of the adjacent surfaces from the said axis of the bolt.

7. In a tool bearing machine having a frame, a tool rest and a wheel gearing, a worm-bearing spindle, the worm cooperating with said wheel gearing to advance the tool rest, a hub or sleeve on said frame serving as a bearing for said spindle, a crank fixed on said spindle and having a sleeve extending at right angles from the outer end thereof, a pin reciprocable in said last-mentioned sleeve, a graduated plate fitting loosely about said spindle adjacent said crank portion and having a plurality of openings therein disposed radially about its center and adapted to receive said pin, a handle at one end of said plate, and a lug disposed opposite to said handle, a bracket disposed at the side of said first sleeve or hub, a multi-surfaced bolt rotatable in said bracket, means for fixing the bolt in position in said bracket, and a micrometer screw extending through said lug and adapted to rest on the adjacent face of said bolt.

JOHN BERGSTRÖM.